United States Patent [19]

Wang

[11] Patent Number: 5,642,732
[45] Date of Patent: Jul. 1, 1997

[54] APPARATUS AND METHOD FOR ESTIMATING MISSING DOPPLER SIGNALS AND SPECTRA

[75] Inventor: John S. Wang, Santa Clara, Calif.

[73] Assignee: Acuson Corporation, MountainView, Calif.

[21] Appl. No.: 434,395

[22] Filed: May 3, 1995

[51] Int. Cl.$^6$ .................................................. A61B 8/00
[52] U.S. Cl. ............................. 128/661.07; 73/626
[58] Field of Search ................. 128/660.05, 660.04, 128/661.07, 661.08, 661.09, 661.1, 661.01, 662.07; 73/625, 626, 861.25, 601; 342/26, 418

[56] References Cited

U.S. PATENT DOCUMENTS

| | | | |
|---|---|---|---|
| 3,690,153 | 9/1972 | Matay | 73/67.8 R |
| 4,043,181 | 8/1977 | Nigam | 73/67.8 R |
| 4,176,658 | 12/1979 | Kossoff et al. | 128/660 |
| 4,356,731 | 11/1982 | Mahony | 73/631 |
| 4,389,893 | 6/1983 | Ophir et al. | 73/599 |
| 4,408,492 | 10/1983 | Kossoff et al. | 73/631 |
| 4,441,368 | 4/1984 | Flax | 73/599 |
| 4,452,085 | 6/1984 | Pelc et al. | 73/631 |
| 4,470,303 | 9/1984 | O'Donnell | 73/602 |
| 4,475,400 | 10/1984 | Flax | 73/631 |
| 4,513,621 | 4/1985 | Renzel et al. | 73/631 |
| 4,559,952 | 12/1985 | Angelsen et al. | |
| 4,569,353 | 2/1986 | Ferrari | 128/660 |
| 4,662,380 | 5/1987 | Riley | 128/660 |
| 4,745,398 | 5/1988 | Tjornehoj et al. | 73/599 |
| 4,751,846 | 6/1988 | Dousse | 73/602 |
| 4,785,818 | 11/1988 | Hardin | 128/660.07 |
| 4,786,818 | 11/1988 | Mead et al. | 250/578 |
| 4,817,617 | 4/1989 | Takeuchi et al. | 128/660.05 |

(List continued on next page.)

FOREIGN PATENT DOCUMENTS

| | | |
|---|---|---|
| 1329733 | 5/1963 | France . |
| 1534366 | 7/1976 | United Kingdom . |

OTHER PUBLICATIONS

Claesson et al., "Frequency-and Depth-Dependent Compensation of Ultrasonic Signals," *IEEE Trans. on Ultrasonics, Ferro, and Freq. control*, Sep. 1988.

DeClercq et al., "Adaptive Gain Control for Dynamic Ultrasound Imaging," 1975 *Ultrasonics Symposium Proceedings*, pp. 59–63.

(List continued on next page.)

*Primary Examiner*—George Manuel
*Attorney, Agent, or Firm*—Brinks Hofer Gilson and Lione; Craig A. Summerfield

[57] ABSTRACT

The invention provides a method and system for estimating missing Doppler signals and spectra in an ultrasound imaging system: (1) parameters representative of a Doppler data model are matched to actual Doppler data that is received; (2) the parameters are interpolated or extrapolated (possibly after normalization, smoothing, or other manipulation) for regions where actual Doppler data is missing ("Doppler gaps"); and (3) a set of synthesized Doppler spectra are constructed, using the model and the interpolated or extrapolated parameters, for those Doppler gaps. The Doppler data model is an autoregressive model, or another model in which the Doppler data may be approximated by supplying a source signal to an autoregressive filter. The parameters of the model comprise a set of autoregressive filter coefficients and a $\sigma^2$ (variance) value. The reflection coefficients of these autoregressive filter coefficients are determined. The reflection coefficients and $\sigma^2$ value for a Doppler gap are interpolated from reflection coefficients and $\sigma^2$ values from at least one block of Doppler data before the Doppler gap and at least one block of Doppler data after the Doppler gap. In a preferred embodiment, a windowing function may be used when combining the actual Doppler data with the synthesized Doppler data. A set of synthesized Doppler spectra may also be determined in response to the Doppler data near the Doppler gap. A white noise source having the interpolated $\sigma^2$ value may be generated and filtered using an autoregressive filter having the interpolated reflection coefficients, to produce a set of synthesized Doppler data.

37 Claims, 4 Drawing Sheets

U.S. PATENT DOCUMENTS

| | | | |
|---|---|---|---|
| 4,852,576 | 8/1989 | Inbar et al. | 128/660.06 |
| 4,887,306 | 12/1989 | Hwang et al. | 382/54 |
| 5,107,841 | 4/1992 | Sturgill | 128/661.09 |
| 5,113,706 | 5/1992 | Pittaro | 73/626 |
| 5,226,420 | 7/1993 | Peterson | 128/661.09 |
| 5,249,548 | 10/1993 | Dupuy | 119/243 |
| 5,271,404 | 12/1993 | Corl et al. | 128/661.08 |
| 5,287,753 | 2/1994 | Routh et al. | 73/861.25 |
| 5,301,168 | 4/1994 | Miller | 367/138 |
| 5,301,670 | 4/1994 | Sato et al. | 128/661.09 |
| 5,301,674 | 4/1994 | Erikson et al. | 128/661.01 |
| 5,313,948 | 5/1994 | Murashita et al. | 128/662.02 |
| 5,476,097 | 12/1995 | Robinson . | |
| 5,531,224 | 7/1996 | Ellis et al. | 128/661.01 |

OTHER PUBLICATIONS

Janssen et al., "Adaptive Interpolation of Discrete–Time Signals That Can Be Modeled as Autoregressive Processes," *IEEE Trans. on Acoustics, Speech and Signal Processing*, Apr. 1986, pp. 317–330.

Kristoffersen et al., "A Time–Shared Ultrasound Doppler Measurement and 2–D Imaging System," *IEEE Trans on Biomedical Engineering*, May 1988, pp. 285–295.

Kuc, "Ultrasonic Tissue Characterization Using Kurtosis," *IEEE Trans. on Ultrasonics, Ferro, and Freq. Control*, May 1986.

Ophir et al., "Digital Scan Converters in Diagnostic Ultrasound Imaging," *Proc. of the IEEE*, Apr., 1979, pp. 654–663.

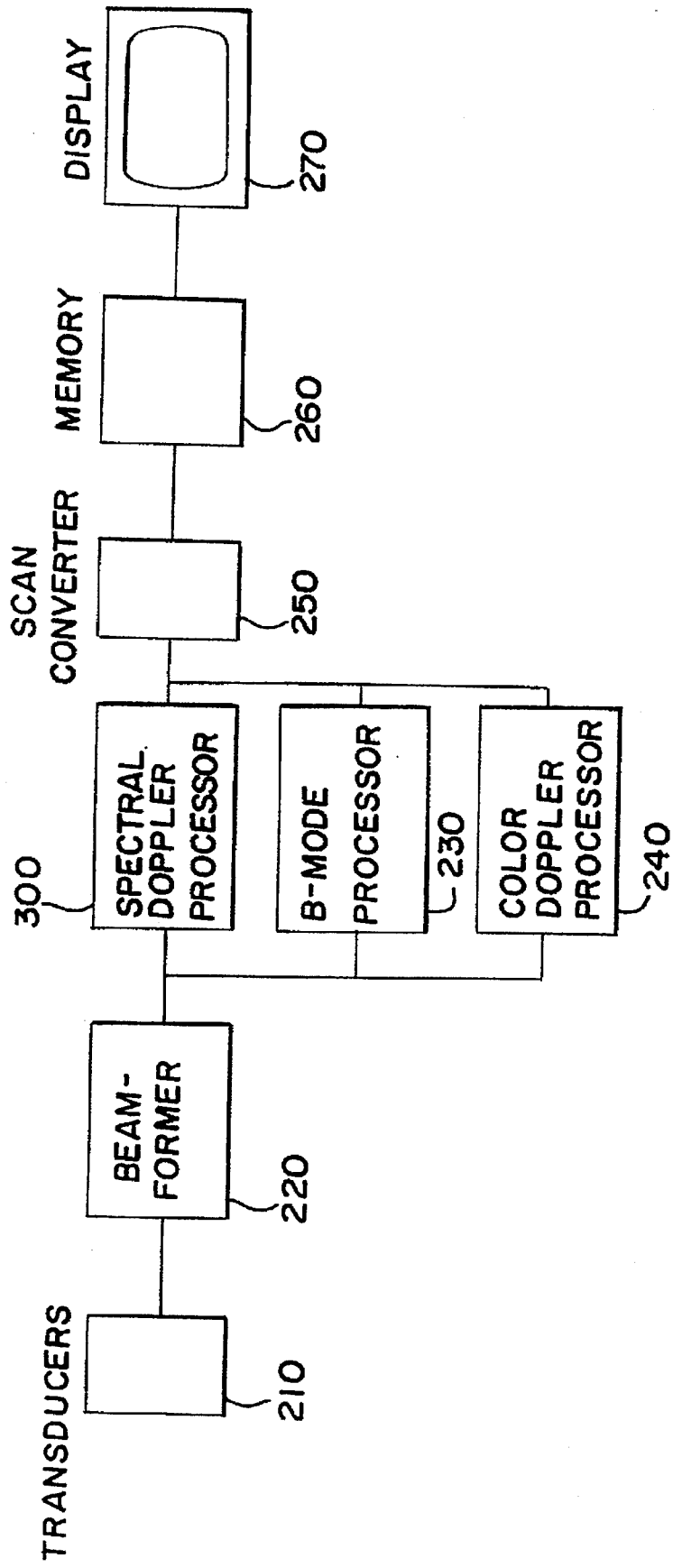

APPARATUS AND METHOD FOR ESTIMATING MISSING DOPPLER SIGNALS AND SPECTRA

BACKGROUND OF THE INVENTION

1. Field of the Invention

This invention relates to an apparatus and a method for estimating missing Doppler signals and spectra.

2. Description of Related Art

In ultrasound imaging systems receiving Doppler signals, there may be several different signals being acquired at once, such as B-mode signals, color Doppler signals, and nonimaging (audio/spectral) Doppler signals. Differing signals are often acquired in a scan line by scan line manner or in a block-interleaved fashion. Block-interleaved signal acquisition comprises periodically allocating a first block of time to acquisition of a first signal and a second block of time to acquisition of a second signal, thus providing a user with an illusion of simultaneous acquisition of multiple signals.

One problem which has arisen in the art is that block-interleaved signal acquisition introduces temporal gaps in the audio/spectral Doppler data. For example, while some other signal is being acquired, the audio/spectral Doppler signal is not being acquired, leaving a data gap. In general, it has been sought to estimate the missing signals, so as to provide a continuous data stream.

One method of the prior art has been to "stretch" the spectral data along the time axis, so that for example, 1 unit of time worth of data would supply 2 units of time worth of signal. This method is illustrated by FIG. 1. A Doppler spectral strip S is seen to vary in frequency content between frequencies f0 and f1, with time increasing from times t0 to t4. (Spectral Doppler signals are normally displayed in "velocity" units in mm/second, which is proportional to frequency shift.) If the signal S1 between times t1 and t2 were missing, i.e., there is a data gap between times t1 and t2, this prior art method would stretch the spectral strip S0, between times t0 and t1, to cover the period between times t0 and t2. Similarly, if the signal S3 between times t3 and t4 were missing, this method would stretch the spectral strip S2, acquired between times t2 and t3, to cover the period between times t2 and t4.

While this method of stretching spectral data along the time axis achieves the goal of providing a continuous data stream, it has the serious drawback of distorting the Doppler spectral strip. A first distortion is that the shape of the spectral strip can be significantly altered by stretching, to the point where there can be a complete mismatch between the spectral strip computed when gaps are present and the spectral strip computed when no gaps are present. This is seen by comparison of the Doppler spectral strip S of FIG. 1A between times t0 and t2, and the stretched Doppler spectral strip S0 of FIG. 1C between times t0 and t2. A second distortion is that the stretching operation can introduce discontinuities between Doppler segments. This is seen by noting the discontinuity at time t2 in FIG. 1C.

Another problem with the stretching method is that the method is only applicable to data gaps in spectral Doppler data, and is not generally applicable to data gaps in audio Doppler data.

Accordingly, it would be advantageous to provide a method and system for estimating either data or spectra generated from the data when there are data gaps in spectral Doppler data, which (1) do not severely distort the data (2) are not subject to the drawbacks of known methods, and (3) provide for presentation of either the data or the spectra of the data using audio/spectral Doppler presentation techniques.

SUMMARY OF THE INVENTION

The invention provides a system in which spectral or audio Doppler information may be acquired in a block-interleaved fashion with B-mode or color Doppler images, so that the images may be displayed simultaneously with the display of a spectral Doppler strip or production of audio Doppler output.

The invention provides a method and system for estimating missing Doppler signals and spectra in an ultrasound imaging system. In the method, (1) parameters representative of a Doppler data model are adjusted to approximate the actual Doppler data that is received; (2) the parameters are interpolated or extrapolated (possibly after normalization, smoothing, or other manipulation) for regions where the actual Doppler data is missing ("Doppler gaps"); and (3) a set of synthesized Doppler signals or spectra is constructed, using the model and the interpolated or extrapolated parameters, to fill those Doppler gaps. Both the actual and synthesized Doppler signals and spectra may then be used to form a continuous audio output or a continuous display, or otherwise used in an ultrasound imaging system.

According to one aspect of the invention, the Doppler data model is an infinite impulse response filter, driven by a source signal. In a preferred embodiment, the Doppler data model is an autoregressive model in which the Doppler data may be approximated by supplying a source signal, preferably white noise, to an autoregressive filter. (An autoregressive filter is a special class of infinite impulse response filter.) The parameters of the model comprise a set of autoregressive filter coefficients $a_k$ and a scalar value $\sigma^2$ representing the variance of the white noise driving the autoregressive filter. The white noise variance and autoregressive filter coefficients may be used to determine reflection coefficients. Alternatively, the reflection coefficients may be estimated using the Doppler data. The reflection coefficients and $\sigma^2$ value associated with a Doppler gap are interpolated from reflection coefficients and $\sigma^2$ values from at least one block of Doppler data before the Doppler gap and at least one block of Doppler data after the Doppler gap. In a preferred embodiment, a windowing function may be used when combining the actual (i.e., acquired) Doppler data or spectra with synthesized Doppler data or spectra.

In a preferred embodiment, a set of synthesized Doppler data for the data gap may be determined in response to the acquired actual Doppler signal. A white noise source having the interpolated $\sigma^2$ value, or alternatively an arbitrarily selected $\sigma^2$ value, may be generated and filtered using an autoregressive filter having autoregressive coefficients corresponding to the interpolated reflection coefficients, or using a lattice filter having the interpolated reflection coefficients, to produce a set of synthesized Doppler data.

BRIEF DESCRIPTION OF THE DRAWINGS

FIGS. 1A, 1B and 1C are collectively referred to herein as FIG. 1.

FIG. 2 shows a block diagram of an ultrasound imaging system including spectral Doppler processing.

DESCRIPTION OF THE PREFERRED EMBODIMENT

Figure 1A:
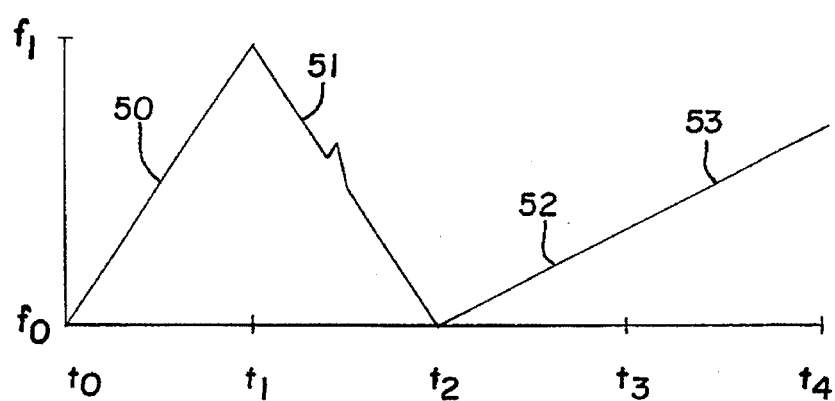
FIG. 1A shows a timing diagram of a spectral Doppler signal (i.e., a Doppler spectral strip).
Figure 1B:
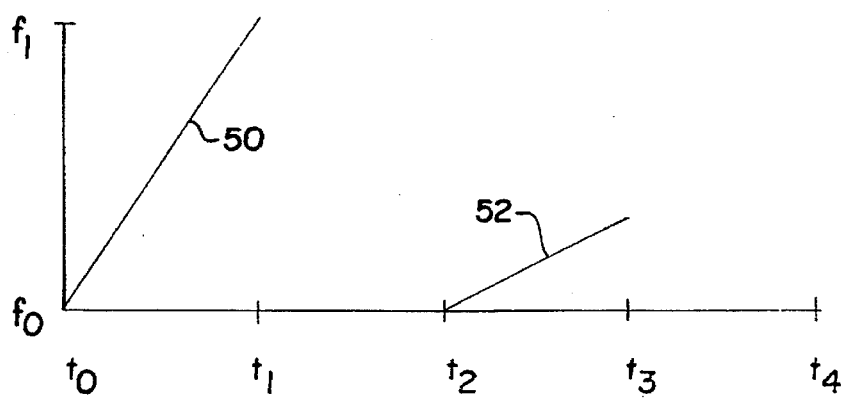
FIG. 1B shows a timing diagram of a spectral Doppler signal with data gaps.
Figure 1C:
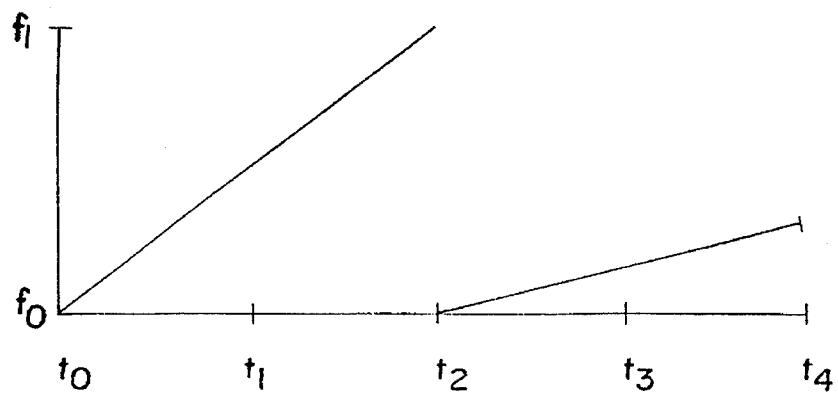
FIG. 1C shows a timing diagram of a spectral Doppler signal which has had portions stretched to cover data gaps.

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

ULTRASOUND IMAGING USING SPECTRAL DOPPLER PROCESSING

FIG. 2 shows a block diagram of an ultrasound imaging system including spectral Doppler processing.

An ultrasound imaging system 200 includes a set of ultrasound transducers 210, which receive ultrasound energy reflected or transmitted from an object or region to be imaged, and convert that ultrasound energy into electrical signals for processing.

The ultrasound transducers 210 are coupled to a beamformer circuit 220, which converts the electrical signals output by the ultrasound transducers 210 to a set of beamformed data samples. Beamformer circuits in ultrasound imaging systems are known in the art.

The beamformer circuit 220 is coupled to a B-mode processor 230, which processes B-mode data samples and outputs processed data samples for storage and display, to a color Doppler processor 240, which processes color Doppler data samples and outputs processed data samples for storage and display, and to a spectral Doppler processor 300, which processes the spectral Doppler data samples as shown herein, and outputs processed data samples and Doppler spectra for storage and display.

The B-mode processor 230, the color Doppler processor 240, and the spectral Doppler processor 300 are coupled to a scan converter 250, which scan converts the processed data samples for display, from there to a memory 260, which stores the scan converted data samples, and from there to a display element 270, which displays the stored data samples.

As described herein, the spectral Doppler processor 300 provides Doppler data and spectra for Doppler data gaps, in response to Doppler data for regions having Doppler data or spectra. The Doppler data and spectra provided by the spectral Doppler processor 300 may be used in the ultrasound system in the same manner as actual Doppler data and spectra. Thus for example, the Doppler data provided by the spectral Doppler processor 300 may be coupled to a Doppler audio processor.

SPECTRAL DOPPLER PROCESSOR

Figure 3:
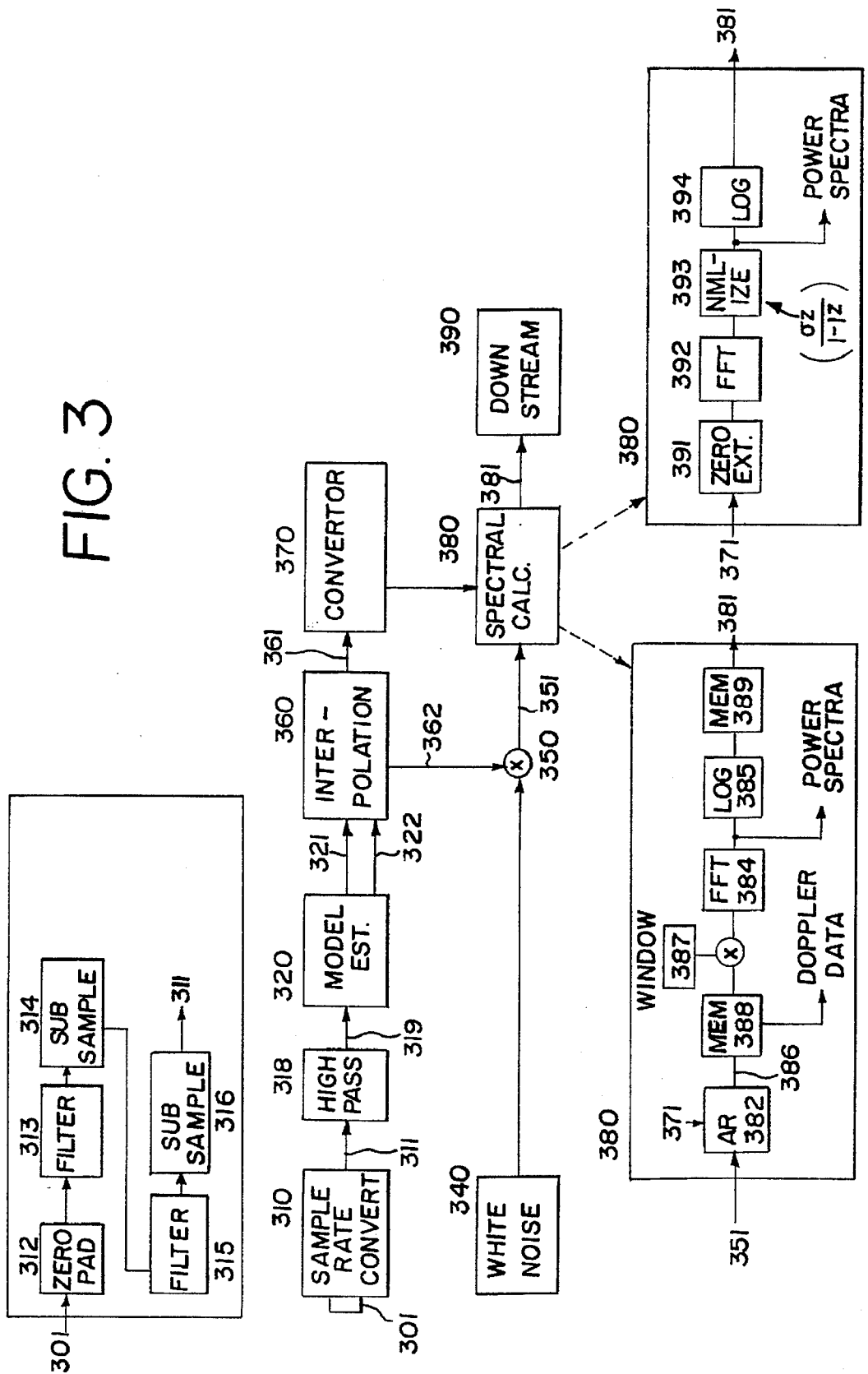
FIG. 3 shows a block diagram of a spectral Doppler processor in an ultrasound imaging system.

FIG. 3 shows a block diagram of a spectral Doppler processor in an ultrasound imaging system.

The spectral Doppler processor 300 comprises an input node 301 coupled to the beamformer circuit 220, at which a stream of beamformer data is received. The beamformer data may comprise continuous wave beamformer data, or may comprise pulse wave beamformer data which has been range gated for an ultrasound scan line. Range gating is known in the art of ultrasound imaging.

The beamformer data comprises a sequence of complex values, often represented as a real part and an imaginary part and called in-phase and quadrature (I/Q) data, but could alternatively be represented as a magnitude part and a phase part or some other representation of a complex value. As used herein, "complex data" means and refers to any and all such data representations, as well as other data representations to be developed which represent complex values such as output by a beamformer.

In a preferred embodiment, the beamformer complex data comprises a stream of 20-bit signed integer values for each of the in-phase and quadrature data values, communicated at a rate of about 50 kilohertz, i.e., one pair of in-phase and quadrature data values about each 20 microseconds.

The input node 301 is coupled to a sample-rate conversion element 310, at which the complex data is sample-rate converted to convert it to a complex data stream at a selected pulse repetition frequency or sample repetition frequency, producing a stream of sample-rate converted data at a node 311. The selected pulse repetition frequency or sample repetition frequency is preferably between about 350 Hertz and about 50 kilohertz, depending on a frequency or velocity scale selected by an operator.

In a preferred embodiment, the sample-rate conversion element 310 comprises a first decimation stage, having a zero-pad element 312 for inserting zero values into the data stream, a first filter 313 for filtering the zero-padded data stream, and a first subsampling element 314 for selecting each M1st element of the filtered data stream. The sample-rate conversion element 310 also comprises a second decimation stage, having a second filter 315 filtering the sub-sampled data stream, and a second subsampling element 316 for selecting each M2nd element of the refiltered data stream. Linear components of the sample-rate conversion element 310 may be reordered from the order shown herein.

Thus, the first decimation stage interpolates and decimates the complex data by a factor of L/M1 (i.e., interpolation by a factor of L, decimation by a factor of M1), and the second decimation stage further decimates the data by a factor of M2, where L, M1, and M2 are selected to achieve the selected pulse repetition frequency or sample repetition frequency. Interpolation and decimation are further described in L. Rabiner and R. Crochiere, *Multirate Digital Signal Processing* (Prentice Hall 1983), hereby incorporated by reference as if fully set forth herein.

In alternative embodiments when no sample-rate conversion is required, e.g., when the sample rate of the complex data at the input node 301 matches the preferred sample rate for processing, the sample-rate conversion element 310 may be omitted.

In a preferred embodiment, the sample-rate conversion element 310 could be omitted if the input selected pulse repetition frequency or sample repetition frequency was equal to the output selected pulse repetition frequency or sample repetition frequency.

The sample-rate converted data at the node 311 is coupled to a high-pass filter 318 for suppressing clutter frequencies close to DC and eliminating DC bias. The high-pass filter 318 generates a filtered output at a node 319.

The node 319 from the high-pass filter 318 is coupled to a model estimation element 320, which determines a stream of model parameters for an autoregressive model of the complex data stream, to produce a stream of model parameters at a node 321. In a preferred embodiment, the model estimation element 320 comprises a least-squares estimation technique, preferably a Burg estimator.

An autoregressive model is an autoregressive filter driven by white noise. An autoregressive filter is a special class of infinite impulse response filter. As used herein, an "infinite impulse response filter" is a digital filter whose impulse response has an infinite number of nonzero terms, and excludes the case where all but a finite number of those terms are zero.

Burg estimators are described in detail in L. Marple, *Digital Spectral Analysis* (Prentice Hall, 1987) (chapter 8), and in Kay, *Modern Spectral Estimation* (Prentice Hall, 1988), each of which is hereby incorporated by reference as if fully set forth herein. Outputs from a Burg estimator comprise a set of autocorrelation terms, a set of autoregressive model parameters, a set of reflection coefficients for those autoregressive model parameters, and a $\sigma^2$ value for the variance of the noise, although in a preferred embodiment not all of these outputs are used and therefore need not be expressly computed.

The autoregressive model presumes that the complex data stream may be approximated by driving an autoregressive filter with a white noise source signal x(n), as shown in equation 330:

$$y(n) = \Sigma \ (k=1 \ to \ p) \ a_k \ y(n-k) + x(n) \quad (330)$$

where x(n) is the source signal;

y(n) is the output of the autoregressive model;

p is the order of the autoregressive model; and $a_k$ are the model parameters, i.e., autoregressive coefficients.

If the driving signal x(n) is white noise, the variance of the noise ($\sigma^2$) is a sufficient description of that signal. The model estimation element 320 determines $\sigma^2$ for the complex data stream and couples a value for $\sigma$ to a node 322.

The output node 322 from the model estimation element 320 is also coupled to the interpolation element 360.

Equation 331 shows the spectrum corresponding to the autoregressive model:

$$\frac{\sigma^2 T}{|1 - \Sigma \ (k=1 \ to \ p) \ a_k \exp(-j \ 2\pi fTk)|^2} \quad (331)$$

The interpolation element 360 fills in gaps in the complex data stream by interpolation (or extrapolation, if the gaps occur at an endpoint of the complex data stream) of successive autoregressive models and $\sigma^2$ values. However, the model parameters are not interpolated or extrapolated directly, because interpolated or extrapolated model parameters may describe an unstable autoregressive filter. Instead, the interpolation element 360 performs interpolation or extrapolation on a set of reflection coefficients $k_1, k_2, \ldots, k_p$, corresponding to the model parameters $a_1, a_2, \ldots, a_p$, and on the $\sigma^2$ values. A necessary and sufficient condition for an autoregressive filter to be stable is that the magnitude of its reflection coefficients must be less than one. The Burg estimation technique always produces reflection coefficients whose magnitude is less than one.

Although in a preferred embodiment, white noise is input to the autoregressive model, in alternative embodiments, colored noise, such as pink noise, could be used. In general, "white noise" is noise with a relatively flat power spectral density; "colored noise" is noise with a relatively non-flat power spectral density; "pink noise" is a result of subjecting white noise to a low pass filter.

Since the model estimation element 320 preferably uses the Burg estimation technique, it determines a set of reflection coefficients $k_1, k_2, \ldots, k_p$, with the set of model parameters $a_1, a_2, \ldots, a_p$, and couples those reflection coefficients to a node 321. However, in alternative embodiments, the model estimation element 320 may determine a set of model parameters $a_1, a_2, \ldots, a_p$, and convert those model parameters to a set of reflection coefficients $k_1, k_2, \ldots, k_p$. The conversion between autoregressive coefficients and reflection coeffecients is known in the art. See, e.g., L. Marple, "Digital Spectral Analysis with Applications", chapter 7, FIG. 7–3.

The output node 321 from the model estimation element 320 is coupled to an interpolation element 360, to produce a stream of interpolated reflection coefficients at a node 361. The interpolation element 360 fills in gaps in the complex data stream by interpolation (or extrapolation, if the gaps occur at an endpoint of the complex data stream) of successive sets of reflection coefficients $k_1, k_2, \ldots, k_p$, corresponding to the model parameters $a_1, a_2, \ldots, a_p$. If the data gap occurs between two sets of complex data, the interpolation element 360 generates an interpolated set of reflection coefficients between them; if the data gap occurs at an endpoint of the complex data stream, the interpolation element 360 generates an extrapolated set of reflection coefficients to fill that data gap.

In a preferred embodiment, the method of interpolation is linear interpolation, determined for each reflection coefficient $k_1, k_2, \ldots, k_p$ independently. Each reflection coefficient is a complex number; linear interpolation preferably acts on the real and imaginary portions of each such complex number, so that between two reflection coefficients $z1 = x1 + j \ y1$ and $z2 = x2 + j \ y2$, the interpolated reflection coefficient will be $(x1+x2)/2 + j \ (y1+y2)/2$. Similarly, the interpolated $\sigma^2$ values will be the arithmetic average of the $\sigma^2$ values for the two autoregressive models being interpolated, or the interpolated $\sigma^2$ value may be set to a predetermined value, such as unity.

However, in a first alternative embodiment, the method of interpolation may act on magnitude and phase portions of each such complex number, so that between two reflection coefficients $z1 = (r1, th1)$ and $z2 = (r2, th2)$, the interpolated reflection coefficient will be $((r1+r2)/2, (th1+th2)/2)$, where r is magnitude and th is phase.

In alternative embodiments, the method of interpolation may act on other features of the reflection coefficients, may perform nonlinear or other types of interpolation, so long as the method of interpolation assuredly generates a set of reflection coefficients corresponding to a stable autoregressive filter. For example, in one alternative embodiment, the method of interpolation may determine the poles of the autoregressive model associated with the complex data stream, and interpolate those poles to generate a new autoregressive model. Similarly, the method of interpolation for $\sigma^2$ values may also comprise a nonlinear interpolation technique.

In alternative embodiments, there may be a plurality of interpolated sets of reflection coefficients and $\sigma^2$ values. For example, the interpolated values may comprise $(x1+\alpha \ (x2-x1)) + j \ (y1+\alpha \ (y2-y1))$, where $\alpha$ depends on which one of the plurality of interpolated sets of reflection coefficients is to be determined. Similarly, the interpolated $\sigma^2$ values may comprise a set of interpolated values responsive to the parameter $\alpha$.

In alternative embodiments, there may be a plurality of sets of Doppler data on each side of a data gap used to determine the interpolated autoregressive model parameters. For one example, the interpolated values may comprise weighted sums of the reflection coefficients and $\sigma^2$ values for each set, so long as the weights are selected to assure that the corresponding autoregressive model parameters will represent a stable autoregressive model. For another example, the interpolated values may be determined responsive to a regression curve drawn responsive to the plurality of autoregressive models each corresponding to a set of Doppler data on one or the other side of the data gap.

A first output node 361 from the interpolation element 360 is coupled to a converter element 370, to convert the interpolated reflection coefficients to autoregressive coefficients for the autoregressive model at a node 371.

A second output node 362 from the interpolation element 360 is coupled, along with an output from a white-noise source 340, to a multiplier 350, to produce a stream of scaled white noise at a node 351.

The output node 371 from the converter element 370 is coupled, along with the output node 351 from the multiplier 350, to a spectral calculation element 380, to produce a stream of calculated spectral Doppler data at a node 381.

In a first preferred embodiment, the spectral calculation element 380 comprises an autoregressive filter 382, a window multiplier 383, an FFT element 384, and a log element 385. The scaled noise from the node 351 is coupled to the autoregressive filter 382, which is controlled by the model parameters from the node 371, to produce a filter output at a node 386.

A memory 388 is used to record the filter output and crossfade the output at the node 386 between actual Doppler data and Doppler data computed for signal gaps. In a preferred embodiment, the crossfade between actual Doppler data and Doppler data computed for signal gaps comprises a linear crossfade, where the output of the crossfade is a weighted sum of actual Doppler data and Doppler data computed for signal gaps, according to the following equation:

crossfade output = ($\alpha$) (actual Doppler data) +

(1 − $\alpha$) (Doppler data computed for signal gap)

where the parameter ($\alpha$) is varied with the complex data sample, so as to linearly ramp from unity to zero over a transition from (actual complex data) to (complex data computed for signal gap) and from zero to unity from (complex data computed for signal gap) to (actual complex data).

In alternative embodiments, the crossfade at the node 386 may comprise a nonlinear crossfade, in which the parameter ($\alpha$) varies nonlinearly with the transition from actual complex data to complex data computed for signal gaps, or from complex data computed for signal gaps to actual complex data. For example, the crossfade parameter ($\alpha$) may comprise a polynomial, an exponential, a convergent infinite series, or a combination thereof, such as a logistical curve or a trigonometric function.

In alternative embodiments, the crossfade at the node 386 may comprise a multiple crossfade in which a plurality of M sets of data are crossfaded together using a weighted sum of M elements for each data element to be produced, or a multiple crossfade in which a plurality of N data elements are produced for each weighted sum, or both at once. In such alternative embodiments, the memory 388 comprises a plurality of M sets of data elements for crossfading, or N sets of data elements produced for each weighted sum, or both.

In a preferred embodiment, the memory 388 comprises a plurality of successive overlapping sets of complex data, so that the FFT element 384 computes successive FFT transforms of successive overlapping sets of complex data.

The memory 388 is coupled, along with a window descriptor 387, to the window multiplier 383, which multiplies the filter output by a window function. FFT window functions are known in the art. A memory 388 is used to store the complex data for conversion by the FFT element 384 into Doppler spectra. An output of the window multiplier 383 is coupled to the FFT element 384 to produce magnitude squared Doppler power spectra. An output of the FFT element 384 is coupled and to the log element 385 to produce calculated Doppler spectra, in logarithmic form. An output of the log element 385 is coupled to the node 381.

After crossfading, data retrieved from the memory 388 may be coupled to elements of the ultrasound system 200 and used therein in the same manner as actual Doppler data. For example, Doppler data retrieved from the memory 388 may be coupled to a Doppler audio processor. Similarly, Doppler spectra output in logarithmic form at the node 381 may be coupled to elements of the ultrasound system 200 and used therein in the same manner as actual Doppler spectra, and Doppler power spectra output at the node 384 may be coupled to elements of the ultrasound system 200 and used therein in the same manner as actual Doppler power spectra.

The output at the node 381 is similarly crossfaded between actual Doppler spectra for actual complex data and calculated Doppler spectra for signal gaps. A memory 389 is used to record the output at the node 381 and crossfade that output between actual Doppler spectra and Doppler spectra computed for signal gaps. In a preferred embodiment, the crossfade between actual Doppler spectra and Doppler spectra computed for signal gaps comprises a linear crossfade, similar to the linear cross-fade at the node 386, and may in alternative embodiments comprise alternative crossfades similar to the alternative crossfades for the node 386.

In a second preferred embodiment, the spectral calculation element 380 comprises a zero-extension element 391, an FFT element 392, a normalizing element 393, and a log element 394. The autoregressive coefficients, determined responsive to the interpolated reflection coefficients, are zero-extended by the zero-extension element 391. The zero-extension element 391 thus operates to append zeros to the autoregressive coefficients prior to computation of their FFT. The padded parameters are transformed into frequency form by the FFT element 392; FFT elements and their operation are known in the art. In a preferred embodiment, the FFT element 392 computes successive FFT transforms of successive overlapping sets of complex data.

The transformed data stream is normalized by the normalizing element 393, which computes the inverse square of each element of the transformed data stream and multiplies by the $\sigma^2$ value for the autoregressive model, to produce a set of Doppler power spectra, which may be used for power-based display of Doppler information, e.g., for computation of power-based waveforms such as mean Doppler frequency. The normalized data stream is placed in logarithmic form by the log element 394, which computes the logarithm of each element of the normalized data stream, to produce a set of Doppler spectra for display in logarithmic format.

Those skilled in the art will recognize, after perusal of this application, that there are many variations which provide for determining either Doppler complex data or Doppler spectra, from autoregressive model parameters and white noise, that such variations could be used to determine such Doppler complex data or Doppler spectra for combination with, or insertion into, the Doppler data stream in data gaps, responsive to extrapolated or interpolated autoregressive model parameters, that modification of the method and system shown herein to accomplish these many variations would be workable, and that such modification would not require either invention or undue experimentation.

The output node 381 from the spectral calculation element 380 is coupled to downstream elements 390 of the ultrasound imaging system, which post-process the spectral Doppler data for delivery to the memory 203.

In a preferred embodiment, the post-processing performed by the downstream elements 390 comprises baseline shifting, log compression, and gain compensation.

METHOD FOR DOPPLER DATA EXTRAPOLATION AND INTERPOLATION

Figure 4:
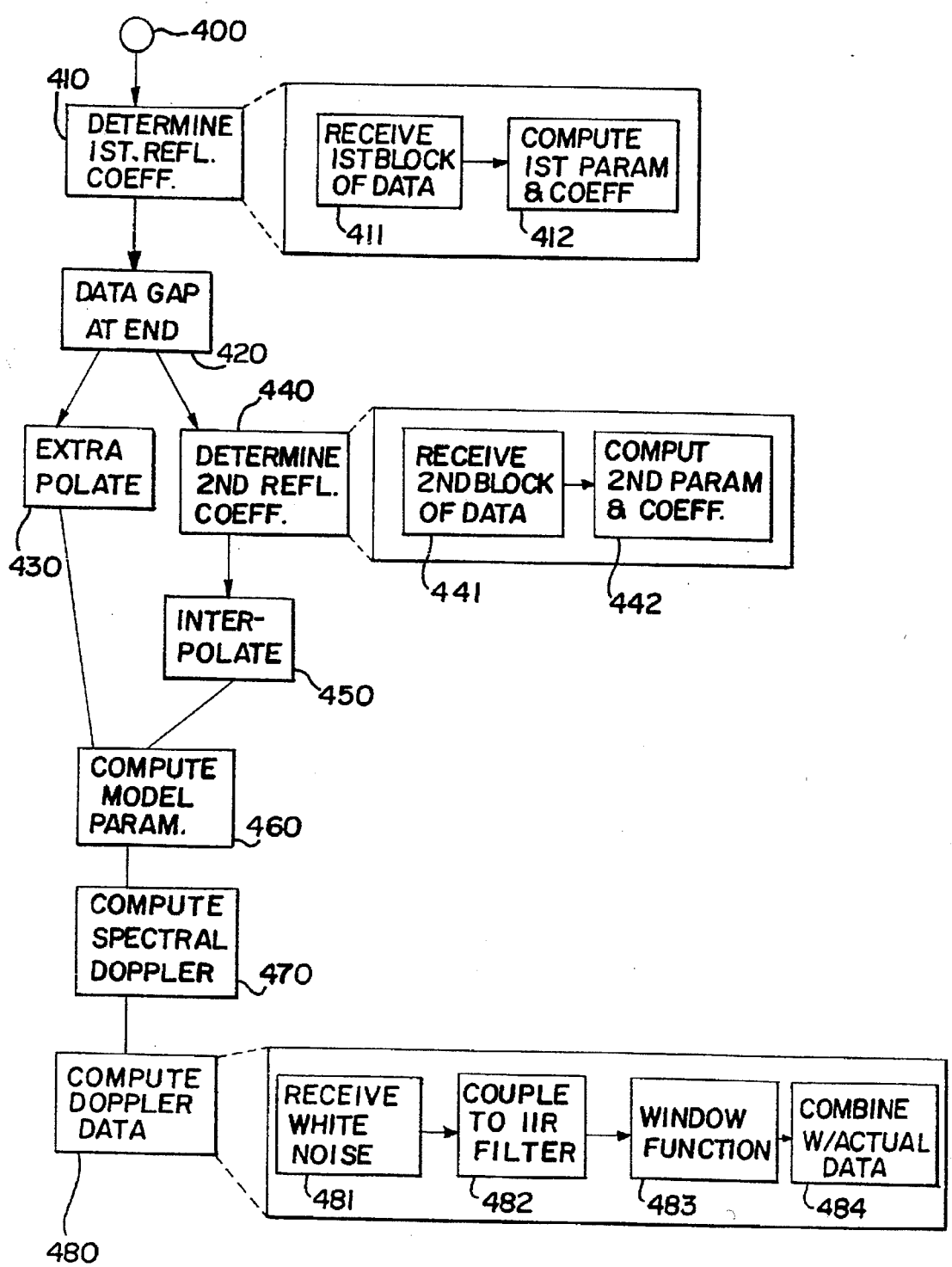
FIG. 4 shows a flow diagram of a method for spectral Doppler data interpolation in an ultrasound imaging system.

FIG. 4 shows a flow diagram of a method for spectral Doppler data interpolation in an ultrasound imaging system.

At a flow point 400, complex data, e.g., from a beamformer, is being received at the spectral Doppler processor 300 with data gaps.

At a step 410, the method determines a first set of reflection coefficients for a stream of the complex data. To perform the step 410, the spectral Doppler processor 300 performs the steps 411 and 412.

At a step 411, the method receives a first block of data in the data stream, before a data gap.

At a step 412, the method computes, for the first block of data, a first set of model parameters for an autoregressive model, a first set of reflection coefficients for the first set of autoregressive model parameters, and a first $\sigma^2$ value. In a preferred embodiment, the model parameters are autoregressive coefficients, and the method computes both sets of values at once using Burg estimation.

At a step 420, the method determines if the data gap occurs at the end of a spectral Doppler data stream. If so, the method proceeds to the step 430. Otherwise, the method proceeds to the step 440.

At a step 430, the method extrapolates one or more sets of estimation values, from the first set of reflection coefficients determined at the step 412, to fill in the data gap, and proceeds to the step 460.

At a step 440, the method determines a second set of reflection coefficients for the data stream. To perform the step 440, the method performs the steps 441 and 442.

At a step 441, the method receives a second block of data in the data stream, after a data gap.

At a step 442, the method computes, for the second block of data, a second set of model parameters for an autoregressive model, a second set of reflection coefficients for the second set of autoregressive model parameters, and a second $\sigma^2$ value. In a preferred embodiment, the model parameters are autoregressive coefficients, and the method computes both sets of values at once using Burg estimation.

At a step 450, the method interpolates one or more sets of estimation values to fill in the data gap, from the first set of reflection coefficients determined at the step 412 and the second set of reflection coefficients determined at the step 442, and proceeds to the step 460.

At a step 460, the method computes a corresponding number of sets of model parameters for the autoregressive model, corresponding to the sets of estimation values for the autoregressive model, from the estimation values extrapolated in the step 430 or interpolated in the step 450. In a preferred embodiment, the model parameters are autoregressive coefficients, the estimation values are reflection coefficients, and the conversion between the two is known in the art.

At a step 470, the method computes a Doppler spectrum to fill in the data gap, from the model parameters determined at the step 460. The method inserts this Doppler spectrum determined in the step 470 into the data gap, and couples the data stream, now without data gaps, to an output node.

At a step 480, the method computes Doppler complex data to fill in the data gap, from the model parameters determined at the step 460. To perform this step 480, the method performs the steps 481, 482, 483 and 484.

At a step 481, the method receives a stream of white noise from a white noise generator.

At a step 482, the method couples the stream of white noise to an autoregressive filter configured with the model parameters determined at the step 460, and receives an output from the autoregressive filter.

At a step 483, the method multiplies the output of the autoregressive filter by a windowing function. In a preferred embodiment, performing the step 483 is optional.

At a step 484, the method combines an output of the step 483 (an output of the step 482 if the step 483 is not performed), and combines that output with actual Doppler complex data, to generate a complex data stream without data gaps. As described with reference to FIG. 3, this step 483 comprises a crossfade function, preferably a linear crossfade function.

Alternative Embodiments

Although preferred embodiments are disclosed herein, many variations are possible which remain within the concept, scope, and spirit of the invention, and these variations would become clear to those skilled in the art after perusal of this application.

I claim:

1. In an ultrasound imaging system, a method comprising the steps of receiving a sequence of Doppler signals, said sequence of Doppler signals having at least one region comprising data and at least one gap;

determining a first set of parameters of a Doppler signal model in response to said sequence of Doppler signals, whereby said Doppler signal model approximates said sequence of Doppler signals in said region comprising data;

determining a second set of parameters of said Doppler signal model, responsive to said first set of parameters, for said gap;

synthesizing a set of Doppler information for said gap in response to said second set of parameters; and combining a set of Doppler information for said region comprising data with said set of Doppler information for said gap.

2. A method as in claim 1, wherein said Doppler information is artificial Doppler data.

3. A method as in claim 1, wherein said Doppler information is spectral information.

4. A method as in claim 1, wherein said Doppler signal model comprises an autoregressive model.

5. A method as in claim 1, wherein said Doppler signal model comprises an infinite impulse response filter.

6. A method as in claim 1, wherein said first set of parameters for said Doppler signal model comprises a noise variance.

7. A method as in claim 1, wherein said step of determining a first set of parameters comprises determining a set of coefficients for a filter.

8. A method as in claim 1, wherein said step of determining a first set of parameters comprises determining a set of coefficients for an autoregressive filter.

9. A method as in claim 1, wherein said step of determining a first set of parameters comprises determining a set of coefficients for an infinite impulse response filter.

10. A method as in claim 1, wherein said step of determining a first set of parameters comprises determining a set of reflection coefficients related to an autoregressive model.

11. A method as in claim 1, wherein said step of determining a second set of parameters comprises interpolating a set of complex values by determining a weighted sum of a magnitude part of said complex values and a weighted sum of an angle part of said complex values.

12. A method as in claim 1, wherein said step of determining a second set of parameters comprises determining a set of reflection coefficients related to an autoregressive filter.

13. A method as in claim 1, wherein said step of determining a second set of parameters comprises interpolating a set of complex values by determining a weighted sum of a real part of said complex values and a weighted sum of an imaginary part of said complex values.

14. A method as in claim 1, wherein said step of determining a second set of parameters comprises interpolating a set of poles for a filter.

15. A method as in claim 1, wherein said step of determining a second set of parameters comprises interpolating said first set of parameters between a first said region comprising data and a second said region comprising data.

16. In an ultrasound imaging system, a method for processing ultrasound imaging signals, comprising receiving a sequence of Doppler signals, said sequence of Doppler signals having at least one gap between a first region comprising data and a second region comprising data;

determining a first variance and a first set of coefficients for a first autoregressive model in response to said sequence of Doppler signals in said first region comprising data, whereby said first autoregressive model with said first set of coefficients and said first variance approximates said sequence of Doppler signals in said first region comprising data;

determining a first set of reflection coefficients in response to said first set of coefficients;

determining a second variance and a second set of coefficients for a second autoregressive model in response to said sequence of Doppler signals in said second region comprising data, whereby said second autoregressive model with said second set of coefficients and said second variance approximates said sequence of Doppler signals in said second region comprising data;

determining a second set of reflection coefficients in response to said second set of coefficients;

interpolating said first and second sets of reflection coefficients to determine a new set of reflection coefficients for said gap;

synthesizing a set of Doppler signal spectra for said gap in response to said new set of reflection coefficients; and combining said Doppler signal spectra using at least one windowing function for said first region comprising data, said gap, and said second region comprising data.

17. A method as in claim 16, comprising the step of interpolating said first variance and said second variance to determine a new variance for said gap.

18. A method as in claim 16, comprising the steps of interpolating said first and second variances to determine a new variance for said gap;

providing a white noise source having said new variance; and filtering an output of said white noise source using an autoregressive filter corresponding to said new set of reflection coefficients, so as to synthesize a set of Doppler data for said gap.

19. Apparatus comprising means for receiving a sequence of Doppler signals, said sequence of Doppler signals having at least one region comprising data and at least one gap;

means for determining a first set of parameters of a Doppler signal model in response to said sequence of Doppler signals, whereby said Doppler signal model approximates said sequence of Doppler signals in said region comprising data;

means for determining a second set of parameters of said Doppler signal model, responsive to said first set of parameters, for said gap;

means for synthesizing a set of Doppler information for said gap; and means for combining a set of Doppler information for said region comprising data with said set of Doppler information for said gap.

20. Apparatus as in claim 19, wherein said Doppler information is artificial Doppler data.

21. Apparatus as in claim 19, wherein said Doppler information is spectral information.

22. Apparatus as in claim 19, wherein said Doppler signal model comprises an autoregressive model.

23. Apparatus as in claim 19, wherein said Doppler signal model comprises an infinite impulse response filter.

24. Apparatus as in claim 19, wherein said first set of parameters for said Doppler signal model comprises a noise variance.

25. Apparatus as in claim 19, wherein said means for determining a first set of parameters comprises means for determining a set of coefficients for a filter.

26. Apparatus as in claim 19, wherein said means for determining a first set of parameters comprises means for determining a set of coefficients for an autoregressive filter.

27. Apparatus as in claim 19, wherein said means for determining a first set of parameters comprises means for determining a set of coefficients for an infinite impulse response filter.

28. Apparatus as in claim 19, wherein said means for determining a first set of parameters comprises means for determining a set of reflection coefficients related to an autoregressive model.

29. Apparatus as in claim 19, wherein said means for determining a second set of parameters comprises means for determining a set of reflection coefficients related to an autoregressive filter.

30. Apparatus as in claim 19, wherein said means for determining a second set of parameters comprises means for interpolating a set of complex values by determining a weighted sum of a magnitude part of said complex values and a weighted sum of an angle part of said complex values.

31. Apparatus as in claim 19, wherein said means for determining a second set of parameters comprises means for interpolating a set of complex values by determining a weighted sum of a real part of said complex values and a weighted sum of an imaginary part of said complex values.

32. Apparatus as in claim 19, wherein said means for determining a second set of parameters comprises means for interpolating a set of poles for a filter.

33. Apparatus as in claim 19, wherein said means for determining a second set of parameters comprises means for interpolating said first set of parameters between a first said region comprising data and a second said region comprising data.

34. Apparatus comprising means for receiving a sequence of Doppler signals, said sequence of Doppler signals having at least one gap between a first region comprising data and a second region comprising data;

means for determining a first variance and a first set of coefficients for a first autoregressive model in response to said sequence of Doppler signals in said first region comprising data, whereby said first autoregressive model with said first set of coefficients and said first variance approximates said sequence of Doppler signals in said first region comprising data;

means for determining a first set of reflection coefficients in response to said first set of coefficients;

means for determining a second variance and a second set of coefficients for a second autoregressive model in response to said sequence of Doppler signals in said second region comprising data, whereby said second autoregressive model with said second set of coefficients and said second variance approximates said sequence of Doppler signals in said second region comprising data;

means for determining a second set of reflection coefficients in response to said second set of coefficients;

means for interpolating said first and second sets of reflection coefficients to determine a new set of reflection coefficients for said gap;

means for synthesizing a set of Doppler information for said gap in response to said new set of reflection coefficients; and means for combining said Doppler information using at least one windowing function for said first region comprising data, said gap, and said second region comprising data.

35. Apparatus as in claim 34, comprising means for interpolating said first and second variances to determine a new variance for said gap;

means for providing a white noise source having said new variance; and means for filtering an output of said white noise source using an autoregressive filter having a set of autoregressive coefficients responsive to said new set of reflection coefficients, so as to synthesize a set of Doppler data for said gap.

36. Apparatus as in claim 34, wherein said Doppler information comprises artificial Doppler data.

37. Apparatus as in claim 34, wherein said Doppler information comprises spectral information.

\* \* \* \* \*